United States Patent
Pirich et al.

(10) Patent No.: US 7,451,490 B2
(45) Date of Patent: *Nov. 11, 2008

(54) MEDIA DATA PROTECTION WITH SECURE INSTALLER

(75) Inventors: Christopher M. Pirich, Seattle, WA (US); Jon Marcus Randall Whitten, Sammamish, WA (US); Jonathan E. Lange, Bellevue, WA (US); Tracy Sharpe, Seattle, WA (US); Keith K. Lau, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 608 days.

This patent is subject to a terminal disclaimer.

(21) Appl. No.: 10/632,250

(22) Filed: Aug. 1, 2003

(65) Prior Publication Data

US 2005/0026698 A1    Feb. 3, 2005

(51) Int. Cl.
*H04L 9/32* (2006.01)
*H04N 7/167* (2006.01)
(52) U.S. Cl. ..................................... 726/26; 380/201
(58) Field of Classification Search .................. None
See application file for complete search history.

(56) References Cited

U.S. PATENT DOCUMENTS

| | | | |
|---|---|---|---|
| 6,468,160 B2 | 10/2002 | Eliott | |
| 6,712,704 B2 | 3/2004 | Eliott | |
| 6,769,989 B2 | 8/2004 | Smith et al. | |
| 2002/0141582 A1* | 10/2002 | Kocher et al. | 380/201 |
| 2003/0182574 A1* | 9/2003 | Whitten et al. | 713/201 |
| 2004/0162137 A1 | 8/2004 | Eliott | |
| 2005/0026698 A1 | 2/2005 | Pirich et al. | |
| 2005/0039035 A1* | 2/2005 | Clowes | 713/193 |
| 2007/0277037 A1 | 11/2007 | Langer | |

* cited by examiner

*Primary Examiner*—Nasser G Moazzami
*Assistant Examiner*—Brandon S Hoffman
(74) *Attorney, Agent, or Firm*—Lee & Hayes, PLLC

(57) ABSTRACT

A data protection portion includes the file alteration checking portion. One aspect of the file alteration checking portion relates to a media including game content and a data protection portion. In one version, the data protection portion protects the game content from modification by determining whether the game content has been modified. If the game content has been modified, then the installation of the game content within the apparatus fails.

34 Claims, 7 Drawing Sheets

MEDIA DATA PROTECTION WITH SECURE INSTALLER

BACKGROUND

Media content to be played on a game console can include optical disk such as DVDs (which means digital video disk or digital versatile disk) or compact disks (CDs). One challenge with the media content with game media involves the potential of modifying the media content. In one version, a user could modify the media content in a manner to be able to find an inherent "security hole" in the game console. Such user modification of the data via a security hole could enable disruption of the intended use of the game console by, for example, defeating a media type check and taking over some control of the game console. Such control may permit, for example, the ability to download or otherwise gain access to relatively expensive media content for free.

Depending on the type of media, it may be easier to find a security hole in the game console as provided by the media content. Consider that a game console can contain a variety of types of media content, with each media content type providing different challenges to users seeking to find a security hole. For instance, certain types of media may be viewed as a stripped-down demonstration (demo) version of a complete game to be run on a game console. Such demos allow potential purchasers to have a look and feel of the game prior to their purchase of the game. The more expensive media content that would be associated with the complete game can be provided with greater security against such security holes than, for example, such inexpensive demos that are intended to be cheap to produce and distribute.

As such, it would be desirable to provide a technique that limits modified media (particularly the relatively inexpensive media) being able to adversely interface with a game console.

SUMMARY OF THE INVENTION

This invention describes multiple versions of media data protection, certain versions of which can be applied to game systems. In one version, the data protection portion includes a file alteration checking portion. One aspect of the file alteration checking portion checks for file alteration of a media including game content and a data protection portion. In one version, the data protection portion protects the game content from modification by determining whether the game content has been modified. If the game content has been modified, then the installation of the game content within the apparatus fails.

BRIEF DESCRIPTION OF THE DRAWINGS

Throughout the drawings, the same numbers reference like features and components.

DETAILED DESCRIPTION

In this disclosure, the term "optical media" includes, but is not limited to, such media as digital video disk or digital versatile disk (DVD) and compact disk (CD). The term "removable media" includes optical as well as magnetic media that can be removed from a memory, and is generally persistent but may also be non-persistent. The term "file" and "file system" relates generally to the logical layout of data on removable media. The terms "sectors", "cluster of sectors", and "cluster of data" includes the physical layout of data on the removable media. The term "executable" includes the code that runs from media, removable or fixed, that can access other data files in addition to an installer as described in this disclosure. The term "data files" includes files that contain data corresponding, e.g., to text files, art files, etc. that are used by the executable file in the course of operation.

Figure 1:
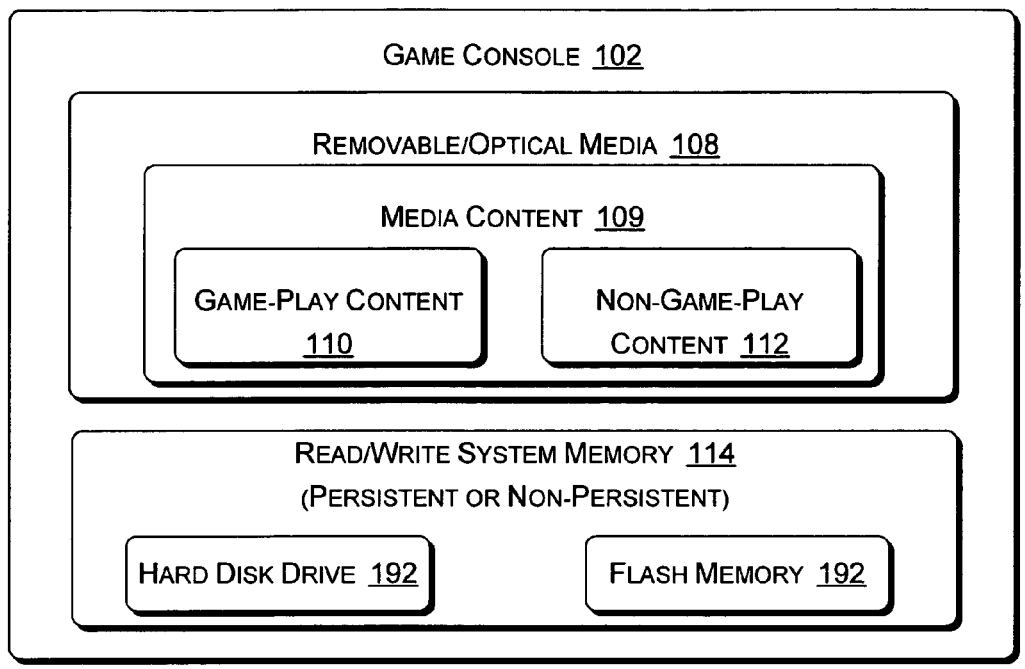
FIG. 1 illustrates a block diagram of one embodiment of a game console.

One aspect of this disclosure relates to security aspects of a game console 102 of FIG. 1. One example of a game console includes, but is not limited to, the Xbox® video game system (manufactured and distributed by Microsoft Corporation). The terms "game content" and "media data content" may be largely synonymous, and include any information (relating to games, entertainment, sports, information, industry, etc.) that is contained on and/or processed on a game console. This disclosure details multiple embodiments of a media data protection process 200 such as described relative to FIG. 2. Using the media data protection process 200 increases the security against modification of the media content 109 (i.e., data or executable code) for the game console 102 released by software distributors. The media data protection process 200 can be used with non-standard media as well as standard removable media 108 for the game console 102.

One embodiment of the game console 102 as described in FIG. 1 includes a read/write system memory 114 that may be persistent, non-persistent, or a combination thereof in different embodiments. The read/write system memory 114 interfaces with a removable media 108. The removable media 108 can be a digital video disk (DVD), a compact disk (CD), a floppy disk, or any other memory device that can be inserted in the game console 102 for storing media content 109.

The most applicable currently-used removable media 108 is the DVD, but it is envisioned that other types of removable media 108 that are being developed or were developed previously) such as CDs are within the intended scope of the present disclosure. CDs have found one particular application in game demos largely because they are relatively inexpensive. Removable media are most applicable to the different embodiments of the media data protection processes because certain types of removable media (such as CDs) are relatively easy for an unintended third party to modify (such as in a remote computer). Different embodiments of the read/write system memory 114 include a hard disk drive 192, a flash memory 192, or other applicable read/write memory.

Different embodiments of the media content 109 to be played on the game console 102 can contain game content 110. In this disclosure, the term "media content" applies to code, information, images, and/or other data that applies to a game that can be played on the game console 102. For example, the media content 109 to be played on a game console 102 can include, but is not limited to, game content 110 and such non-game content 112 as movie content, music content, audio content, video content, video conferencing content, and/or digital video disk (DVD) content. The game content can also include, e.g., data and media relating to vehicles, characters, weapons, spells, levels, updated statistics, or other such graphically displayable or game usable information that applies to any particular game to be played on a game console that is generally known to user/players of game consoles.

In this disclosure, the media content 109 can include any game content 110 that can optionally be combined with non-game content 112. The game consoles and the media are configured to provide access to both types of content.

Figure 2:
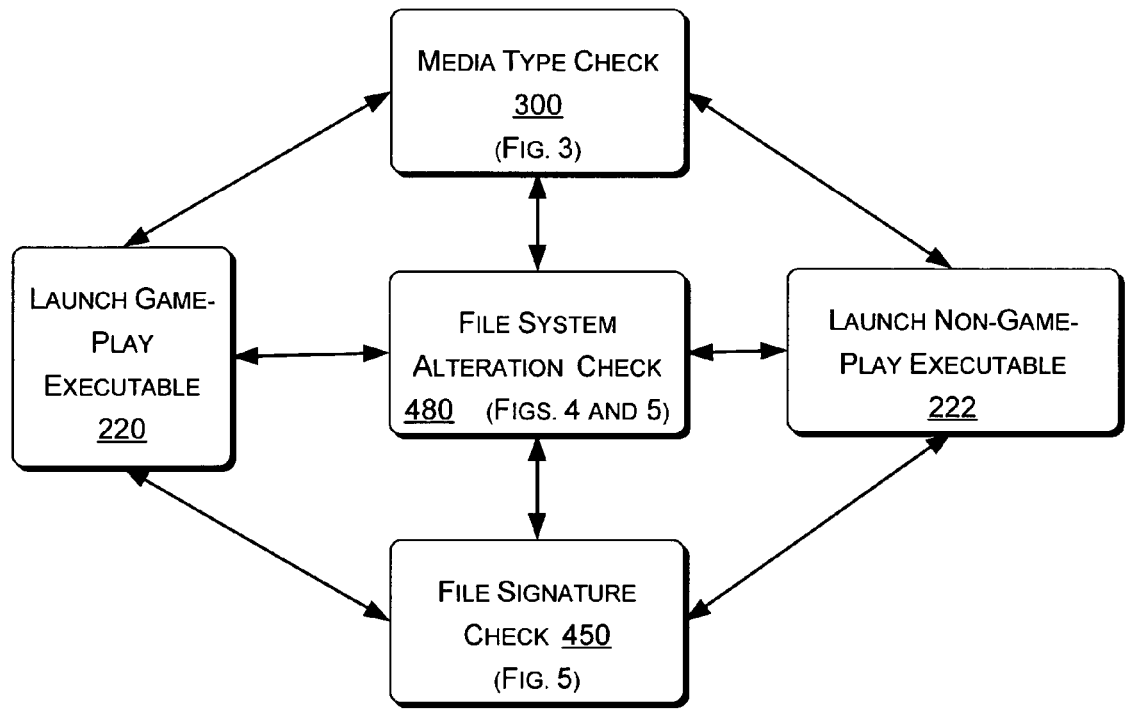
FIG. 2 illustrates a flow chart of one embodiment of media data protection process that can run on the game console of FIG. 1.

A plurality of distinct media data protection processes as described in this disclosure reduces the modification of the media content 109. These media data protection processes are illustrated in FIG. 2 and include: (1) a media type check 300, one embodiment of which is described relative to FIG. 3; (2) a file alteration check 480, different embodiments of which is described relative to FIGS. 4 and 5; and (3) a file signature check 450, one embodiment of which is described relative to FIG. 6. The FIG. 5 embodiment of the file alteration check may be considered a file system alteration check. These checks 300, 450, and 480 can be run in any order or combination. Not every check is essential for every embodiment of media data protection process. In different embodiments of the disclosure only one check may be performed, two of the three checks may be performed, or all three checks may be performed.

In one embodiment of the media type check 300, the media data protection process determines whether the type of media is as expected for the executable, and therefore determines whether the media content has been copied to an unauthorized type of media. As such, within certain embodiments of the media data protection process 200 the data protection portion reduces the possibility of allowing game content copied from a pressed optical disk to an end user/player writable disk from being executed from the user/player writable disk.

One embodiment of the file alteration check 480 checks whether the file has been altered in an unauthorized manner such as a size or location change of a file in the disk layout. In addition, the file alteration check can detect file content changes (which is also accomplished by the file signature check).

In one embodiment of the file signature check 450, the media data protection process checks whether the content of a file is as expected based on the file signature being as expected. Signatures (which in some embodiments are referred to as hashes) represent a complex mathematical function of the file content. Modification of the file content would therefore alter the value of the signature. As such, the file signature check indicates that the file has been modified.

Different versions of certain ones of the checks 300, 450, and 480 are described in this disclosure. After the media type check 300 is satisfactorily run, the game executable 220 is launched (or continued if it has already been launched). After the file signature check 450 is satisfactorily run, the game executable 220 and/or the non-game executable is launched (or continued if already launched).

After the file alteration check 480 is satisfactorily run, the non-game executable 222 and/or the game executable 220 is launched (or continued if it already has been launched). In one embodiment, if at least one of the media type check 300, the file alteration check 480, and the file signature check 450 is unsuccessfully run (as described herein relative to respective FIGS. 3, 4, and 5) then the respective executable is not launched, or can be terminated if already launched.

Figure 3:
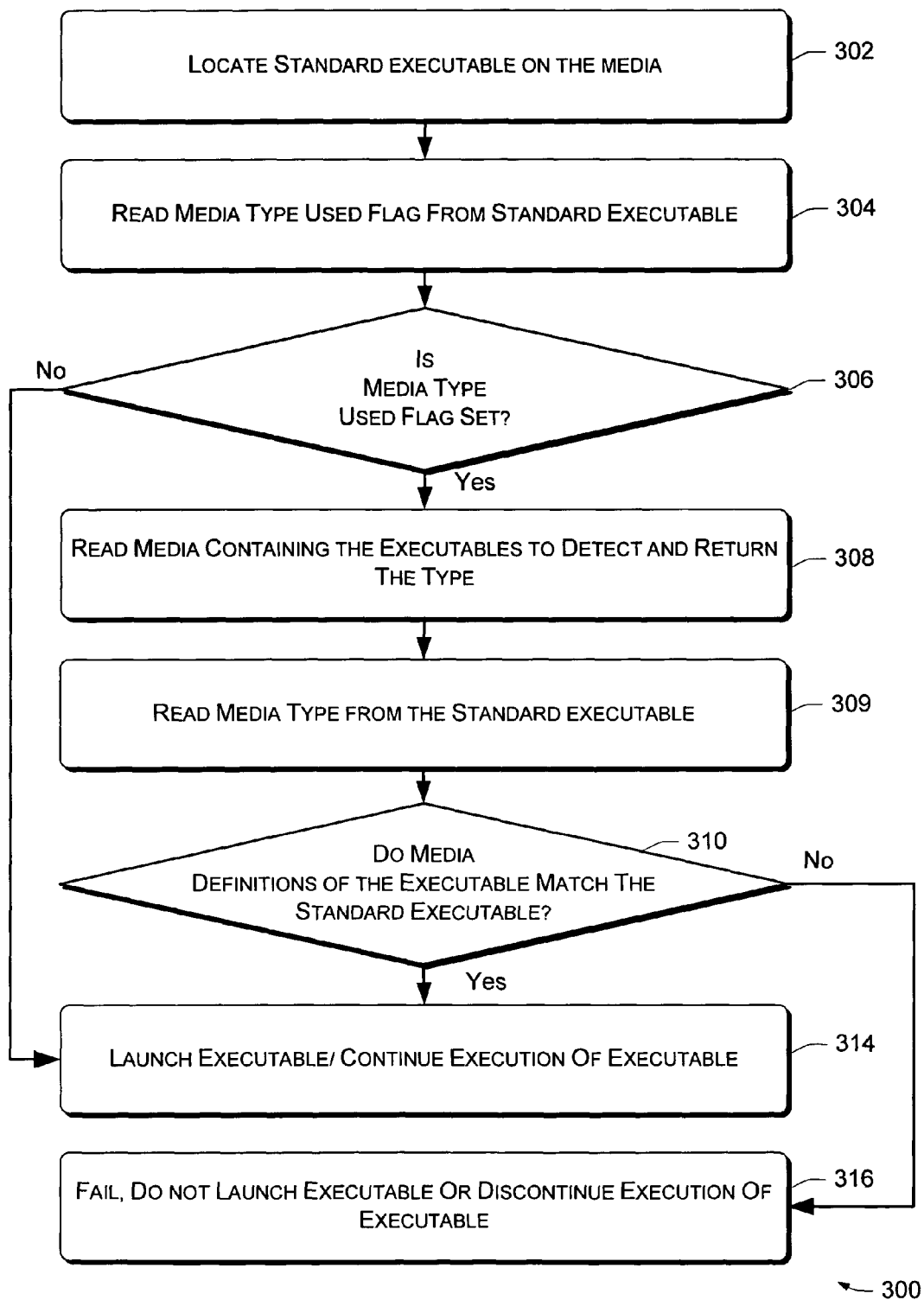
FIG. 3 illustrates a flow chart of one embodiment of the media type check as shown in the media data protection process of FIG. 2.

One embodiment of the media type check 300 is illustrated in FIG. 3. For the game console, the media type is stored in the actual executable file itself. In the media type check 300, the standard executable is located (found) on the media in 302. In 304, a media type allowed flag is read from the standard executable that was located in 302. The media type allowed flag indicates the type of media on which the executable should be located. Practically, 304 can be performed many times for each time 302 is performed.

In decision 306, the game console 102 determines whether the media type allowed flag is set. If the answer to decision 306 is no, then the media type check continues to 314. If the answer to the decision 306 is yes, then the media type check 300 continues to 308 in which the media containing the executable is read to detect and return the type. The media type check continues to 309 in which the media type is read from the standard executable.

The media type check 300 continues to 310 in which the game console 102 determines whether the media definitions of the executable match that of the media. If the answer to decision 310 is no, then the media type check 300 continues to 316. In 316, the executable fails to launch if it has not already been launched. Alternatively in 316, the executable discontinues the execution of the executable if the executable has been launched. If the answer to decision 310 is yes, then the media type check continues to 314 in which the executable is launched if the executable has not already been launched. If the executable has already been launched, then the execution of the executable is continued.

The media type allowed flag indicates a type of media that the executable should be contained within (and optionally also indicates that the check should be performed). If the media type of the executable does not match the media type of the media, as determined in decision 310, then the media type check continues to 316 in which the media type check 300 fails, and the executable is not launched. This process will then be terminated since the game console 102 cannot launch the executable.

For one example of media type checking, when a user/player inserts a removable media 308 such as a DVD, the game console will check the type of standard executable (e.g., DVD-5 or DVD-R as illustrated in Table 1 below). Such media as DVDs come in a range of physical formats with differing capacities and costs associated with their production. DVDs often have the same dimensions as a CD, but each DVD is created with two polycarbonate substrates that are bonded together like a sandwich. This allows the opportunity to have disks with up to two sides and possibly four readable surfaces as shown in Table 1.

Two embodiments of the DVD media are described within Table 1 (DVD-5 and DVD-R). DVD-5 is created using specially manufactured equipment, and is currently often relied on by game manufacturers to produce the original media disk. The media type checking 300 ensures that the media type matches that media which was originally used to produce the disk. If the originally produced disk is in the DVD-5 format, then the media type allowed flag indicates the DVD-5 type. If the game is then placed on a DVD-R disk (e.g., by an unauthorized user/player burning a copy of the DVD), then the media type check 300 fails since the expected type of media (i.e., DVD-5) does not match the actual type of media (i.e., DVD-R).

TABLE 1

DVD Formats

| Name | Capacity (GB) | Layers | Sides | Operation |
|---|---|---|---|---|
| DVD-5 | 4.7 | 1 | 1 | This media can be read from one side only. It is inexpensive to buy and produce, but can only be created using specialist pressing machinery. |
| DVD-R | 4.7 to 9.4 | 1 | 1 or 2 | This media can be read from up to 2 sides of 1 layer. It is inexpensive to produce and can be written to by readily accessible burners. This is typically the type of media used by home PCs. |

Within the file alteration check, the game system (e.g., the root directory for the Xbox® video game system) takes a user/player to where the files are stored where the executable file is being checked for the media type in the media type check. In one embodiment, the root directory for the game media content contains the game console executable files. In one version, the root directory becomes important because this is where the game console searching for the game media content expects to find its executable files. In different embodiment of the executable files may be located at different locations within software and/or hardware of the game console.

Adding the media type check as shown in FIG. 3 to the game launching executable file disallows execution from any media other than that defined in the file (e.g. pressed DVD-5). Therefore, an unauthorized user/player can not just make a copy of the ISO (Disk image file) and burn it to DVD-R— having the executable on a DVD-R will prevent the executable from being executed. The code responsible for launching the executable file that includes the media type check 300 therefore checks the disk type and enforces the media type check 300 before playing the media on the game console 102.

Once the media type (that is determined to be correct for the game console) is confirmed using the media type check 300, then in one embodiment the executable is launched. This step can be used to either open the data file, copy the data files to a hard drive, read certain sectors of the data file, or perform a similar routine.

The combination of additional media data protection mechanisms will be determined by the file read access profile of the actual game being protected. Detection of the profile does not need to be done real time, and can be done as part of the development and shipped as data with the executable. The profiling indicates the applicable types of media data protection process 200 for a particular game. The profile of security will be obtained, and it can be determined which security method of the media data protection process 200 to use for peak performance on the game cycle.

While the embodiment of media type check 300 described relative to FIG. 3 compares different types of DVD media (i.e., DVD-5 and DVD-R), this particular implementation of the media type check is illustrative in nature and not limiting in scope. It is intended that a similar media type check can be applied to any type of formatted media in which the media producers typically produce their media in one particular format.

Figure 4:
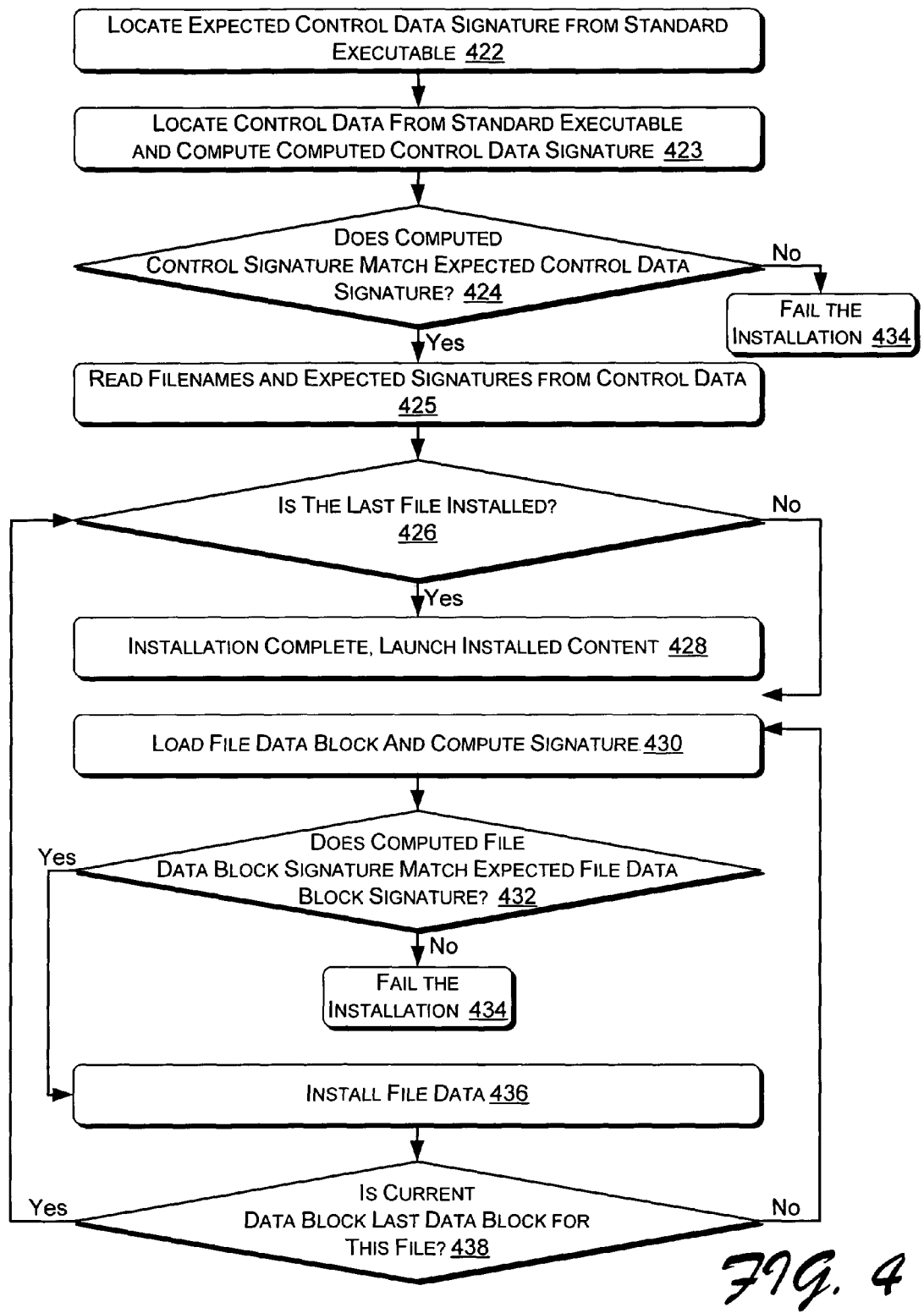
FIG. 4 illustrates a flow chart of one embodiment of a file alteration check as shown in the media data protection process of FIG. 2.
Figure 5:
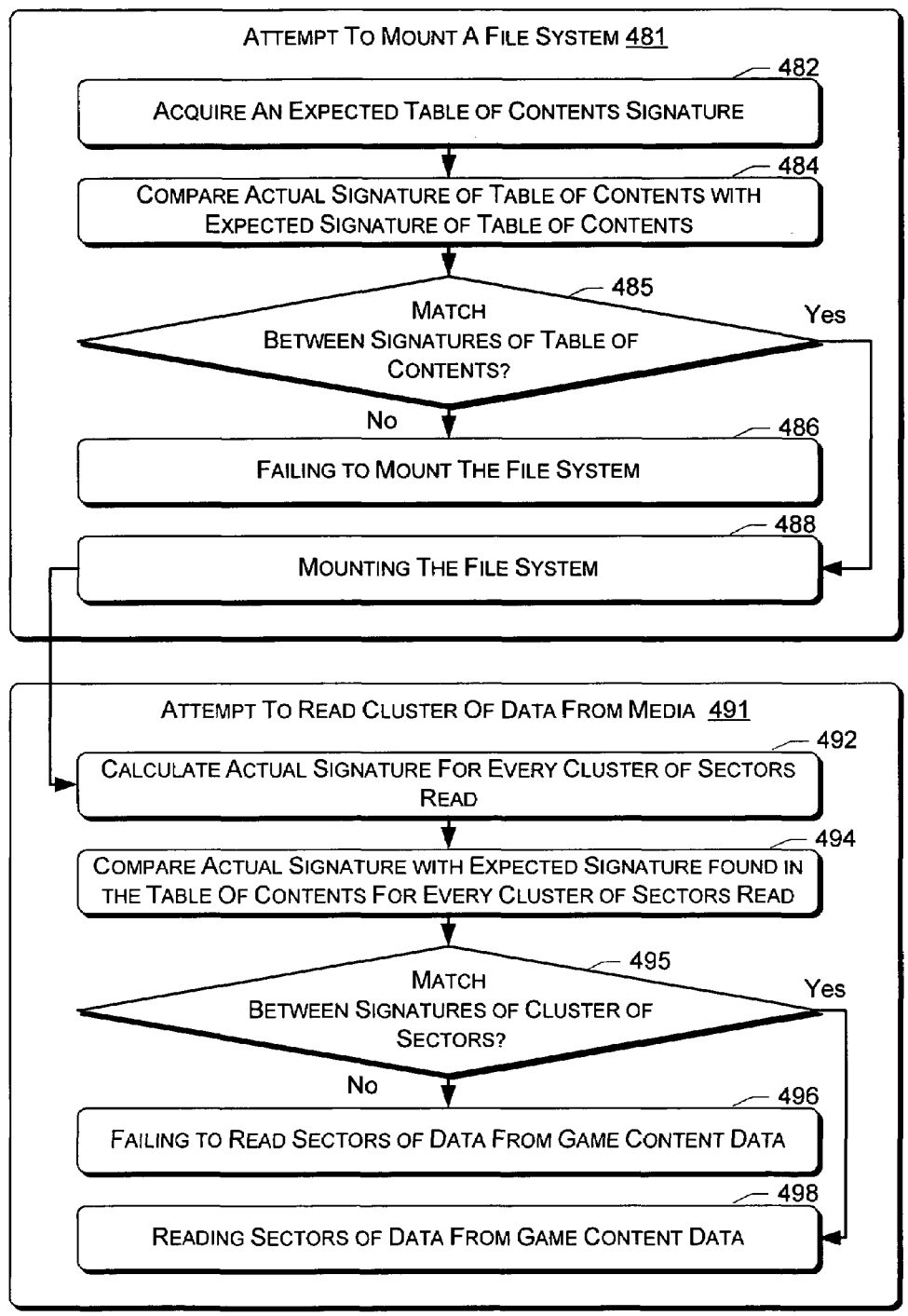
FIG. 5 illustrates a flow chart of another embodiment of the file system alteration check as shown in the media data protection process of FIG. 2.

Certain embodiments of media data protection process 200, as illustrated in FIG. 2, also include the file alteration check 480 (different versions are describe with respect to FIGS. 4 and 5). In general, the file alteration check may be viewed as checking the physical layout of the disk. The file alteration check generally works on clusters of data at a sector level and utilizes the physical media (e.g., checksums of the layout of the binary on the physical media).

The embodiments of the file alteration check 480 as described relative to FIGS. 4 and 5 include an attempt to install the file segment 481 and an attempt to read a cluster of data from a media segment 491. Both the attempt to install the file segment 481 and the attempt to read cluster of data from a media segment 491 generally operate by attempting to match an actual signature with an expected signature.

In one version, the media type check 300 as described relative to FIG. 2 may be considered as a check of the format and contents of the entire removable optical media 108 as shown in FIG. 1. The file alteration check 480 as described relative to FIGS. 4 and/or 5, by comparison, may be considered as a check on the format and contents of the files that are stored on the removable optical media 108 as shown in FIG. 1.

The attempt to install the file using an installer program may be considered as an attempt run a first executable (i.e., the installer) that installs a second executable (i.e., the gameplay content 110 and/or the non-game-play content 112 of the media content 109 as shown in FIG. 1). The attempt to read a cluster of data from a media segment 491 may be considered as a piecemeal comparison of a large number of actual signatures to a large number of expected signatures (that correspond to the number of cluster of data). Not all data needs to be checked, the developer may configure which checks to run at any point in the execution of the application. Certain embodiments of attempting to install the file segment 481 compares a single expected signature to a single actual signature (that corresponds to the Table of Contents for the disk).

Alternatively, the attempt to read data from game content data segment 491 may have to read many clusters of data since a reasonable amount of data such as used for games. For example, 1 Mbyte of data or more that many games require represents a considerable amount of data. As such, quick checks of many (if not all) of the cluster of data are important in the attempt to read data from game content data segment 491 in the attempt to install the file segment 481.

There are a variety of storage media sector and sector configurations that the present disclosure concerns. Data is stored on DVDs using a variety of file formats including the Universal Disk Format (UDF) which is a file system chosen for DVD which would suit both read-only and writable versions. UDF is based on the standard International Standards Organization (ISO) 13346. There is a modified version of UDF that is applicable to game consoles.

In one embodiment, the directory structure of a DVD disk uses two directories, a Video_TS directory and an Audio_TS directory. The Video_TS directory is automatically read by DVD video readers and thus must be present in this security method to ensure the resulting disk will play in standard readers as well as the game console 102. An exemplary DVD directory structure using UDF is shown in Table 2. The description of UDF is meant to be illustrative as software that can be used by computers and/or game consoles in general.

TABLE 2

File Formats

Optical Disk Root

| | Sub Directory One | Sub Directory Two | Sub Directory Three | Sub Directory Four | Sub Directory Five |
|---|---|---|---|---|---|
| Name Content type | Other 1 Optional | Video_TS Video Files | Audio_TS Audio Files | Other 2 Optional | Other 3 Optional |

Two versions of the file alteration check 480 are now described relative to FIGS. 4 and 5. In the file system alteration check, certain file information is considered during the attempt to install the file.

To define the term "control data" as described relative to FIG. 4, consider that within one embodiment of the standard executable such as runs on the game console 102 shown in FIG. 1, there are sections that either contain code or data. Control data may be considered as a data section belonging to an executable. A purpose of the control section is to store information about file data blocks and their expected signatures/hashes.

Within FIG. 4, a signature (such as in one embodiment a hash) is derived for both control data (in 423) and the file data block (in 430) using a mathematical computation (e.g., a hashing algorithm). The expected control signature can be derived using the same hash algorithm (though produced previously before the media content 109 as shown in FIG. 1 was produced) as the computed control data signature as is known. Similarly, the expected file data block signature is derived using the same hashing algorithm (though produced previously before the media content 109 as shown in FIG. 1 was produced) compared with the computed file data block signature.

The embodiment of the file alteration check 480 described relative to FIG. 4 includes 422 in which an expected control data signature is located from a standard executable. The embodiment of file alteration check 480 shown in FIG. 4 continues to 423 in which control data is located from a standard executable, and a computed control data signature is computed from the located control data.

The embodiment of file alteration check 480 shown in FIG. 4 continues to decision 424 in which it is determined whether the computed control data signature located in 423 matches the expected control data signature located in 422. If the answer to decision 424 is no, then the file alteration check 480 continues to 434 in which the installation is failed. If the answer to decision 424 is yes, then the embodiment of file alteration check 480 shown in FIG. 4 continues to 425 in which the filenames and the expected file data block signatures are read from the control data located in 423. In one version, the expected file data block signatures read in 425 can take the form of an expected hash. In one embodiment, the filenames and the expected file data block signatures are arranged in a packet (not shown). The packet will typically include a file name followed by a signature, then another file name followed by another signatures, etc. Different packet configurations that include filenames and expected file data block signatures are within the intended scope of the present disclosure.

The embodiment of the file alteration check 480 described relative to FIG. 4 continues to decision 426 in which it is determined whether the file being installed is the last file to be installed. If the answer to decision 426 is yes, the file alteration check 480 therefore continues to 428 in which the installation is complete, and the installed content (the game executable) is launched. 426 represents the possible termination of the file alteration check program 480 as shown in FIG. 4 that has been looping through the portion of the program including 426, 430, 432, 436, and 438 as shown in FIG. 4 and described herein.

Within this disclosure, the term "media content" includes both another executable and the media content. The file content can include the game-play content 110 described relative to FIG. 1. When the media content (such as the files that are being installed in 426) is being installed, both game code and game media (data such as a picture, audio, sound, etc.) are being installed using the same mechanism. In 428, the term "launch installed content" acts to run the game code in the executable that was installed as the last file was installed. Running the game code acts to provide a hand-off from the installer code to the now-installed game code that will run and act to load the game media.

If the answer to 426 is no in the embodiment of the file alteration check 480 described relative to FIG. 4 (indicating that the last file has not been installed into the installer), then the file alteration check 480 continues to 430. In 430, the file data block is loaded into the read/write system memory 114 as shown in FIG. 1. The file data block signature is also computed from the file data block in 430. In one embodiment, the file data block signature can take the form of a hash. In different embodiments, the file data block loaded in 430 is compressed or not compressed. In those embodiments that the file data block is compressed, the data will be decompressed prior to the installation in 436.

In one embodiment, the game media code can be loaded from the optical media 108 as shown in FIG. 1. The signature/hash checks in decisions 424 and 432 are performed to ensure that the data has not been modified. The file data is then installed in one of the memories in the read/write system memory 114 (e.g., the hard disk memory 192 or the flash memory 192) in 436, which in turn causes the game media to be installed in the read/write system memory 114. The file data with the game media can be run from the read/write system memory 114 when loaded therein, as known generally in computer environments.

In one embodiment of the file alteration check 480 described relative to FIG. 4, the file alteration check 480 continues to decision 432 in which it is determined whether the computed file data block signature computed in 430 matches the expected file data block signature read in 425. In one embodiment the root directory for the game media content contains the game console executable files (which represents where the game console searching for the game media content expects to find its executable files). In different embodiment of the executable files may be located at different locations within software and/or hardware of the game console. If the answer to decision 432 is no, then the embodiment of the file alteration check 480 described relative to FIG. 4 continues to 434 in which the installation is failed. If the answer to decision 432 is yes, then the file data is installed in 436.

The portion of the embodiment of the file alteration check 480 described relative to FIG. 4 including 426, 430, 432, 436, and 438 continues to loop until all of the file data blocks in the file have been installed. Following 436, the embodiment of the file alteration check 480 described relative to FIG. 4 continues to decision 438 in which it is determined whether the current file data block is the last file data block for the file being installed. If the answer to decision 438 is yes, then the file alteration check continues to decision 426 as described above. If the answer to decision 438 is no, then the file alteration check continues to 430 as described above.

The embodiment of file alteration check 480 as described relative to FIG. 5 (which may be run instead of or in addition to the embodiment of the embodiment of file alteration check 480 as shown in FIG. 4) includes an attempt to mount a file portion 481 and an attempt to read clusters of data from a media portion 491 is now described. The attempt to mount the file system segment 481 starts with 482 in which the expected signature for the table of contents is acquired from some secure means (typically using encryption). The signature of the table of contents is read. In 484, the actual signature of the table of contents is compared with the expected signature of the table of contents. Following 484, the attempt to mount the file system segment 481 continues to decision 485 in which it is determined whether there is a match between the actual signature of the table of contents and the expected signature of the table of contents.

If decision 485 concludes that there is no match, then the file system alteration check 480 terminates at 486 in which the file system is not mounted. If decision 485 concludes that there is a match, then the file system alteration check 480 continues to 488 in which the file system is mounted, at which time the file system alteration check 480 continues or starts to attempt to read sectors of data from the game content data segment 491.

The attempt to read sectors of data from the game content data segment 491 starts with 492 in which the actual signature is calculated or read from the table of contents for every cluster of sectors read. In one implementation, the file system checks the signature for each sector or group of sectors as they are read. The sectors of the media are read for each cluster of sectors.

In 494, the actual signature and the expected signature are compared for each cluster of sectors read. The attempt to read sectors of data from the game content data segment 491 continues to 495 in which it is determined whether the actual signature matches the expected signature for each cluster of sectors.

If the decision 495 determines that the actual signature matches the expected signature, then the file system alteration check 480 continues to 498 in which the cluster of sectors of data are read from the media. During the reading of the cluster of sectors of data from the media, the executable file is launched if not already launched, or the execution of the executable file is continued if previously launched.

If the decision 495 determines that the actual signature does not match the actual signature for any one of the cluster of sectors, then the file system alteration check 480 continues to 496 in which the sectors of data are failed to be read from the media. If the sectors are not read from the media for any cluster of sectors, then the executable is not launched and/or the operation of the already executing executable file is discontinued.

As such, if the expected file signatures do not conform to the actual signatures that the game console expects at any point during the file alteration check as described relative to FIG. 4 or 5, the file alteration check could abort the running of the game content 110 or the non-game content 112 (depending on the software designer) in the removable media 108.

Figure 6:
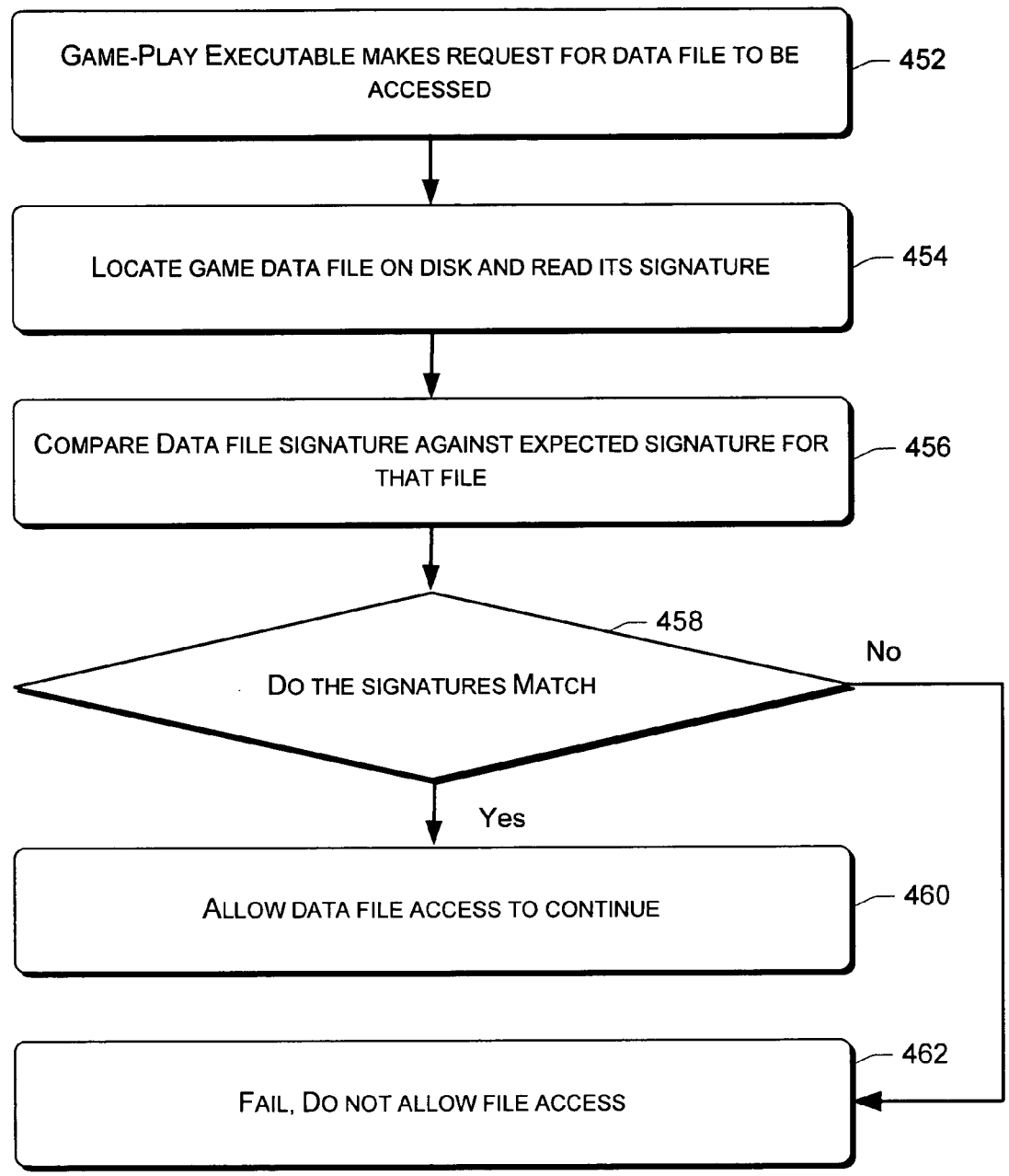
FIG. 6 illustrates a flow chart of one embodiment of the file signature check as shown in the media data protection process of FIG. 2.

Certain embodiments of media data protection process 200, as illustrated in FIG. 2, also includes the file signature check 450 as shown in FIG. 6. In general, the file signature check 450 refers to the logical layout of the media. The file signature check utilizes encryption techniques of logical files.

The file signature check 450 includes 452 in which the gameplay executable makes a request for a data file to be accessed. In 454, the game data file is located on the disk and its signature is read from the disk. The file signature check 450 continues to 456 in which the data file signature located in 454 is compared against the expected signature for that file.

The file signature check 450 continues to decision 458 in which it is determined whether the data file signature located in 454 matches the expected signature for that file. If the answer to decision 458 is no, then the file signature check 450 continues to 462 in which the data file is not provided access to continue. If the answer to decision 458 is yes, then the file signature check 450 continues to 460 in which the data file is provided access to continue.

Certain embodiments of the removable media 108 provide the user/player benefit of being able to easily transfer files from one game is console to another. Such removable media 108 also provides the challenge that certain user/players may wish to copy the files from one disk to another disk, and some unauthorized user/players may wish to modify the contents of the game content. The present disclosure provides a mechanism that reduces the possibility of allowing such modified game content files to execute.

For example, modification of the executable on the disk could allow certain unapproved third party applications to be booted on the game console. This modification of the executable can be done in prior art systems by opening the box of the game console and modifying hardware. Once media content (such as on an optical disk) is modified, the media content can easily be copied and, for example, distributed on copied discs or via the Internet. By employing the media data protection process 200 described herein, such modifications can be protected against (by not allowing such content to be executed or accessed on the game console).

It is envisioned that combining a variety of different types of media contents 109 on the removable media 108 can provide an improved experience for the user/player of the game console 102 (e.g., a more multimedia experience or a more varied experience). For example, assume that a particular removable media 108 (e.g., an optical disk or DVD) for a game console 102 includes the game content 110 based on a theme of a movie.

It would likely make it more attractive for a user/player of the removable media 108 to receive such additional non-game content 112 on the removable media 108 as additional scenes of the movie, clips of making the movie, a video of a band making music for the movie, and so forth. These types of non-game content 112 are contained on the same removable media 108 as the game media 110 to be played by the game console 102. Similar multimedia media (DVD) could be produced for a variety of scenarios.

In this disclosure, the term "multimedia" relates to a removable media 108 including a plurality of types of media content. The media content 109 that is contained on the removable media 108 can include game content 110, non-game content 112, or a combination of game content 110 and non-game content 112. The media content 109 is developed by the software developer and can be played by a user/player within the game console 102.

As such, media content 109 (including a combination of game content 110 and non-game content 112) being played on a game console 102 acts to transform the game console 102 into a true multimedia device. Multimedia aspects of the game console apply to games, sporting events, entertainment, video conferencing, and so forth, as well as any combination of these. A user/player could therefore view non-game media as well as game media by inserting a disk such as a DVD within the game console 102. The game console 102 therefore can be used as an interactive home entertainment center.

The cost of making the removable media 108 to be used with game consoles 102 is typically more expensive than the media used for such non-game console applications (such as normal DVDs or CDs). User/players typically have a better experience with (and are willing to pay more for) removable media 108 to be played on the game console 102 compared with removable media to be played on traditional DVD or CD players largely because of the high degree of interactivity available on the game console. A downside of producing relatively expensive games on removable media is that the expense of a game media disk (or multimedia disk) makes it more attractive for pirates and hackers to produce media knock-offs and other inexpensive modified copies of the game media disks.

It is also attractive for certain unauthorized user/players to modify the game content to be configured to play on unauthorized disks. Such unauthorized modification of game content by copying and modifying the disk, in general, is providing a major challenge for the game, movie, computer, home entertainment, sports, music, and other entertainment industries. By employing the media data protection process 200, such unauthorized modifications can be protected against (by not allowing such files to be executed or accessed on the game console).

Certain aspects of this disclosure relate to security aspects of the media content 109 for game consoles 102 as provided by the media data protection process 200. The security aspects act to reduce unauthorized modification of the media content 109 within the removable media 108 (and also provide some protection against copying). One aspect of this disclosure relates to the security aspects of the removable media 108 (including a CD, a DVD, or any other type of media storage device) containing one or more types of media content 109. The game content 110 and the non-game content remain more secure within the removable media 108 for the game console 102. The transfer of modified files that compromise the security of the game console 102 will be greatly reduced. The disclosure enables combining diverse types of game content 110 more securely with certain types of non-game content 112 (e.g., music and movies).

Certain embodiments of the game console described in this disclosure allow the playback of game content 110 simultaneous with the playback of the non-game content 112. Such playback occurs without requiring the use of expensive specially formatted DVD media.

Game consoles 102 exist in a cost-competitive field. In certain embodiments, the game content 110 can be shipped at a reasonably low cost, while the non-game content 112 included with the removable media 108 provides extra value to the removable media 108 and the game console. The inclusion of the non-game content 112 with the game content 110 provides an incentive for the user/player to purchase the removable media 108 (e.g., DVD) containing the media content 109, and not just modify the content of the media. For instance, in a game console being used for a car racing game, additional non-game content such as statistics of current drivers, video clips of an actual car racing circuit with actual car racing drivers, etc. could well enhance the user/player's experience.

In certain embodiments of the present disclosure, if an unauthorized user/player could modify the game content 110 and non-game content 112 from a media (e.g., by burning the DVDs), then it would be less attractive for that user/player to purchase a legitimately produced disk. Certain media content 109 that includes the game content will only play in a closed platform that does not allow data downloads. Such reduction of the content of the removable media 108 that can be modified or copied to another media makes the original media more attractive, which means that user/players will want to use the original disk instead of modifying the content of the disk.

Game content 110 can be distributed with such non-game content as movies and music. As such, a user/player can interface with a variety of types of media content 109 using the game console 102 instead of a single type of media content (game content). This interaction with multiple types of media content does not compromise the integrity of the game console 102 such as would occur by exposing the media content to external hacks that exist with networked personal computers.

Optical disks such as DVDs have become the media of choice for such game consoles 102 as the Xbox® video game system. It is envisioned, however, that any removable media 108 that can run on the game console is within the scope of the present disclosure. As such, one embodiment of this disclosure provides the media data protection process that protects data from a hacker. Different embodiments of the media data protection process 200 can be applied to virtually any media. The media type is important to consider relative to the media data protection process 200 in that certain media can be modified much easier than other media.

There are advantages to applying the media data protection process 200 to certain embodiments of the game console 102 instead of, for example, a personal computer (PC) or a laptop computer. For computers that are not game consoles 102, the value of the media data protection process may be less valuable because, for example, security can be added to a typical computer such as a PC or laptop computer using a software firewall. Game consoles are less expensive than PCs or laptop computers, and as such sometimes cannot support as sophisticated of a security mechanism as a firewall. Certain embodiments of the game console 102 are a closed platform. A user/player cannot download data that is not authorized by the producer of such a closed-platform game console 102 into the game console.

Certain data downloads for the media data protection process 200 are considered desirable. A producer of the game console may authorize the user/player of certain types of data downloads (such as downloads that alter the statistics and players of a football team for a football video game) by storing this type of data in a form that can be readily modified. A producer of a game console may not store other types of data (such as data that provides a more complete multimedia experience for the game media) in a form that permits easy modification. As such, the producer of a game console, as well as a software developer and/or hardware developer for the game console, can produce their products such that certain types of data relating to the game can be easily modified, while other types of data is much more difficult to modify. In all cases, the unauthorized modification of this data is not desirable for the producer of a game console.

Many current game consoles 102 can physically play CDs including the audio. To play a DVD movie in the game console 102, additional external hardware may be needed. In the Xbox® video game system embodiment of game console, for example, a remote control and a dongle are used to play a DVD on a game console. The dongle incorporates components that allow the DVD content to be decoded and played back. Alternatively, some game consoles 102 may not use any such external hardware. In certain embodiments, the code associated with the DVD could be packaged on such a media as a DVD disk itself to allow the DVD disk to run on the game console 102 (so there is no need for the traditional DVD remote).

In general, before using any file, one embodiment of the media data protection processes 200 as illustrated in FIG. 2 is performed. In certain embodiments, it is not desired to transfer any file to the memory location in the game console 102 prior to the media data protection processes 200 being performed.

With a relatively small program, a content developer/designer or game console developer/designer may wish to copy the media to the system memory 114, check the system memory 114 for files, check the files for data types, check for signatures on the files, and then no additional checks of the files need be performed. With a frequently accessed file, a particular file is checked once as it is copied to the hard drive, and after it is stored on the hard drive it does not have to be checked again. Another technique is to cache which checks have been performed and stack rank the importance of redoing the check. This means the check may not be performed every time the file is accessed, but is always performed first time it is accessed.

With a large program, the security check(s) for the files are performed as the files are used. Depending on performance considerations, the developer may optionally have multiple checks performed concurrently using parallel computing techniques.

The number of checks to be performed on a file can be a performance consideration. For frequently accessed files, or small files, the data for the files may be stored at a predetermined location on the hard drive instead of reading the files from the removable media. For each file access, the files can be checked to make certain that they contain that data which they should contain (e.g., for a data file at the beginning of a program, the signature could be checked for that file when execution of the program begins). As the data is then stored on the hard drive, subsequent access to the data can be performed without repeating the checking.

Using the media data protection processes 200, it is envisioned that a game console such as the Xbox® video game system can therefore securely run movies, videos, DVDs, and a wide variety of media. As use of game consoles using the media data protection processes 200 becomes more accepted and understood, the scope of the game console applications will increase. The game console can provide a variety of entertainment solutions rather than just game solutions. The security issues for the game console remains similar whether being used as a more inclusive entertainment solution or a directed game solution.

A user/player can view and interact with a game console having improved multimedia aspects by illustrating a sporting event, a concert event, or a theater event using the game console so the user/player can control certain aspects of where the user/player is located (based on the display of the game console) in a particular venue. For example, a user/player could control whether they were viewing a concert from the front row, the back row, or on the stage. In traditional videos, the viewer of a movie, concert, or game is positioned where the camera is located. As such, the game console 102 can be used for interactive concerts and sports events whereby a user/player of the game console 102 is allowed to move anywhere they wish within the auditorium, concert venue, sports arena, or the like. The interactivity provided to certain embodiments of game console allows virtual user/players to appear in the game console 102 to stand on the stage next to a performer or sports figure (if so desired), or alternatively move further away. Another virtual user/player can appear in the game console 102 to move around relative to a football player, tennis player, golfer, baseball player at different distances there from. The interactivity provided to different user/players of the game console therefore becomes considerable.

The producer of the media content 109 for a particular removable media 108 would therefore collaborate with, for example, the artist or player to provide the game content 110 and the non-game content 112 to be included on the removable media 108. The removable media 108 (e.g., CD or DVD) associated with the media content 109 is formatted and recorded in a particular manner to allow this type of translation around the auditorium. While this removable media 108 formatting can be done on a computer such as a personal computer (PC), game consoles 102 typically have less memory capabilities. Providing such a variety of media content 109 to be provided for the removable media 108 for a game console 102 has many fascinating potential applications.

Figure 7:
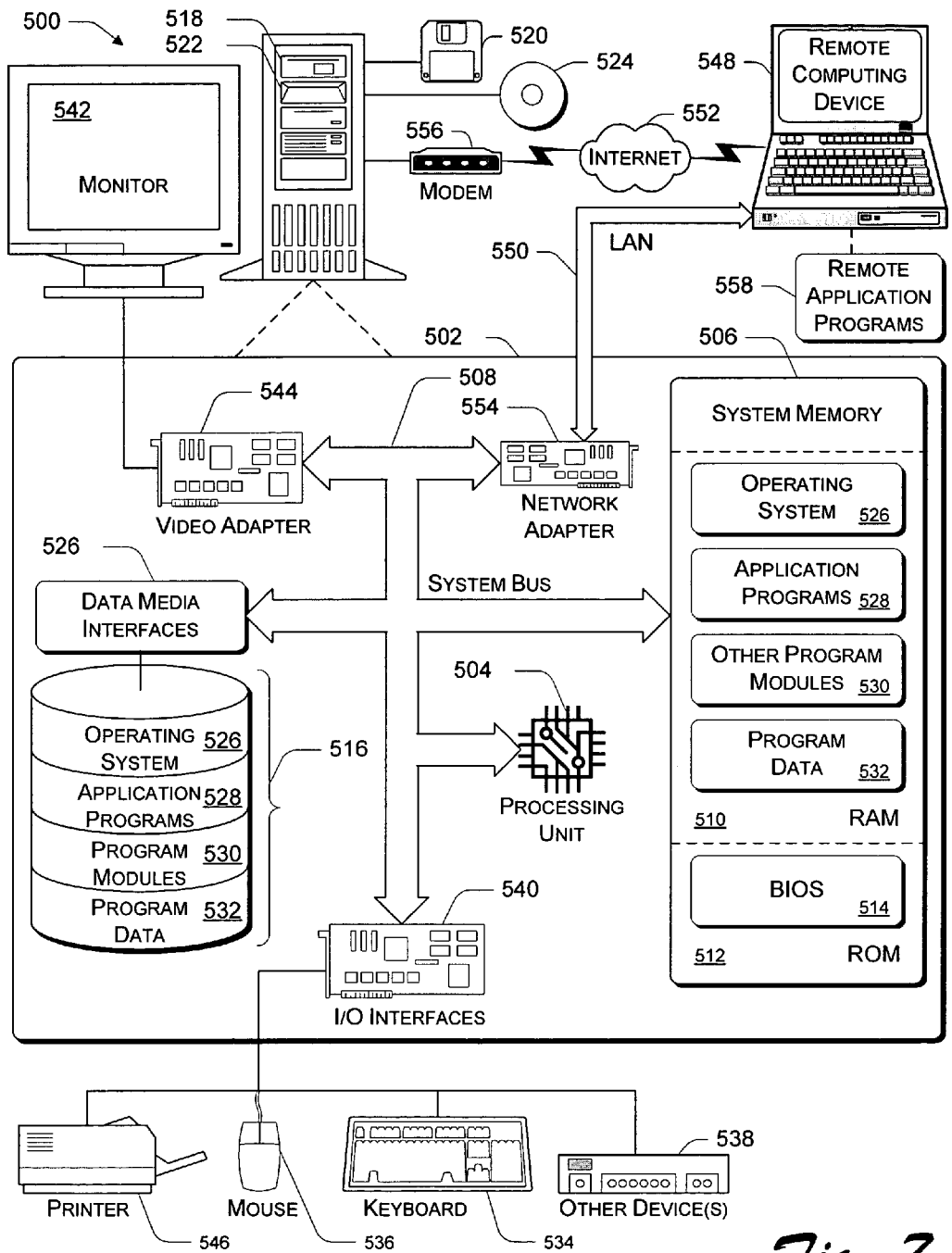
FIG. 7 illustrates a general computer environment, which can be used to implement the media data protection processes as described herein.

FIG. 7 illustrates a general computer environment 500, which can be used to implement the game console 102 techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

The computer environment 500 includes a general-purpose computing device in the form of a computer 502 that can be used to provide the game console 102. Computer 502 can be, for example, a game console as shown in FIG. 1. The components of computer 502 can include, but are not limited to, one or more processors or processing units 504 (optionally including a cryptographic processor or co-processor), the system memory 506 (that may include all, or a portion of, the system memory 114 of FIG. 1), and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 7 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user/player can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, game console 102, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 8:
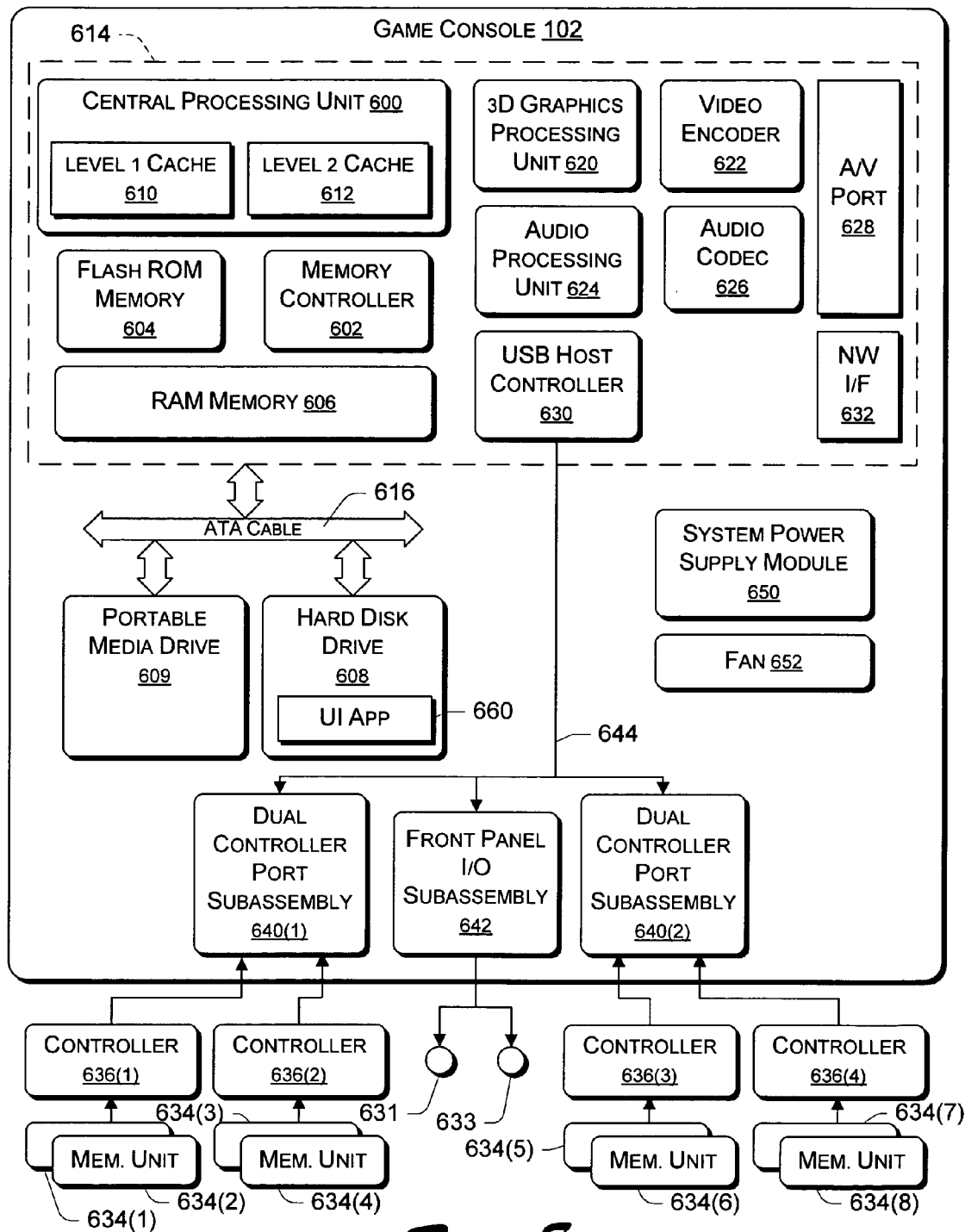
FIG. 8 shows certain embodiments of functional components of the game console located within the computer environment of FIG. 7.

FIG. 8 shows functional components of one embodiment of the game console 102 as shown in FIG. 1 in more detail (e.g., the Xbox® video game system as produced and distributed by Microsoft Corporation). The game console 102 has a central processing unit (CPU) 600 and a memory controller 602 that facilitates processor access to various types of memory, including a flash ROM (Read Only Memory) 604, a RAM (Random Access Memory) 606, a hard disk drive 608, and a portable media drive 609. CPU 600 can for example be equipped with a level 1 cache 610 and a level 2 cache 612 to temporarily store data and hence reduce the number of memory access cycles, thereby improving processing speed and throughput.

CPU 600, memory controller 602, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 600, memory controller 602, ROM 604, and RAM 606 are integrated onto a common module 614. In this implementation, ROM 604 is configured as a flash ROM that is connected to the memory controller 602 via a PCI (Peripheral Component Interconnect) bus and a ROM bus (neither of which are shown). RAM 606 is configured as multiple DDR SDRAM (Double Data Rate Synchronous Dynamic RAM) that are independently controlled by the memory controller 602 via separate buses (not shown). The hard disk drive 608 and portable media drive 609 are connected to the memory controller via the PCI bus and an ATA (AT Attachment) bus 616.

A 3D graphics processing unit 620 and a video encoder 622 form a video processing pipeline for high speed and high resolution graphics processing. Data is carried from the graphics processing unit 620 to the video encoder 622 via a digital video bus (not shown). An audio processing unit 624 and an audio codec (coder/decoder) 626 form a corresponding audio processing pipeline with high fidelity and stereo processing. Audio data is carried between the audio processing unit 624 and the audio codec 626 via a communication link (not shown). The video and audio processing pipelines output data to an A/V (audio/video) port 628 for transmission to the television or other display. In the illustrated implementation, the video and audio processing components 620-628 are mounted on the module 614.

Also implemented on the module 614 are a USB host controller 630 and a network interface 632. The USB host controller 630 is coupled to the CPU 600 and the memory controller 602 via a bus (e.g., PCI bus) and serves as host for the peripheral controllers 636(1)-636(4). The network interface 632 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 640(1) and 640(2), with each subassembly supporting two game controllers 636(1)-636(4). A front panel I/O subassembly 642 supports the functionality of a power button 631 and a media drive eject button 633, as well as any LEDs (light emitting diodes) or other indicators exposed on the outer surface of the game console. The subassemblies 640(1), 640(2), and 642 are coupled to the module 614 via one or more cable assemblies 644.

Eight memory units 634(1)-634(8) are illustrated as being connectable to the four controllers 636(1)-636(4), i.e., two memory units for each controller. Each memory unit 634 offers additional storage on which games, game parameters, and other data may be stored. When inserted into a controller, the memory unit 634 can be accessed by the memory controller 602.

A system power supply module 650 provides power to the components of the game console 102. A fan 652 cools the circuitry within the game console 102.

A console user/player interface (UI) application 660 is stored on the hard disk drive 608. When the game console is powered on, various portions of the console application 660 are loaded into RAM 606 and/or caches 610, 612 and executed on the CPU 600. Console application 660 presents a graphical user/player interface that provides a consistent user/player experience when navigating to different media types available on the game console.

Game console 102 implements a cryptography engine to perform common cryptographic functions, such as encryption, decryption, authentication, digital signing, hashing, and the like. The cryptography engine may be implemented as part of the CPU 600, or in software stored on the hard disk drive 608 that executes on the CPU, so that the CPU is configured to perform the cryptographic functions. Alternatively, a cryptographic processor or co-processor designed to perform the cryptographic functions may be included in game console 102.

Game console 102 may be operated as a standalone system by simply connecting the system to a television or other display. In this standalone mode, game console 102 allows one or more players to play games, watch movies, or listen to music. However, with the integration of broadband connectivity made available through the network interface 632, game console 102 may further be operated as a participant in online gaming, as discussed above.

Although systems, media, methods, approaches, processes, etc. have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

The invention claimed is:

1. An apparatus comprising:
a media including game content; and
a data protection portion that includes:
   a file alteration checking portion which protects the media from modification of the game content by determining whether the game content has been modified, and if the game content has been modified, then installation of the game content within the apparatus fails; and
   a media type checking portion for checking whether the media is as expected for an original media that has not been copied by reading a media type used flag from an executable located on the media, wherein the media type used flag indicates a type of media that the executable should be contained within, and if the type of media of the executable is not as expected, then installation of the game content within the apparatus fails.

2. The apparatus of claim 1, wherein the game content includes music that can be played on the game console.

3. The apparatus of claim 1, wherein the game content includes audio that can be played on the game console.

4. The apparatus of claim 1, wherein the game content includes non-game related material that can be played on the game console.

5. The apparatus of claim 1, wherein the game content includes game related material that can be played on the game console.

6. The apparatus of claim 1, wherein the media includes a removable media that is removable from the apparatus.

7. The apparatus of claim 1, wherein the media includes a removable media that is removable from the apparatus, and wherein the removable media includes an optical disk.

8. The apparatus of claim 1, wherein the media includes a removable media that is removable from the apparatus, wherein the removable media includes a digital video disk.

9. The apparatus of claim 1, wherein the apparatus includes a game console.

10. The apparatus of claim 1, wherein the media type used flag also indicates whether a media type check should be performed.

11. The apparatus of claim 1, wherein the media type checking portion reduces the possibility of copying the game content from a pressed disk to an end user writable disk by indicating when the pressed disk is an appropriate media type.

12. The apparatus of claim 1, wherein the data protection portion checks the entire file to ensure that the media has not been invalidated.

13. The apparatus of claim 1, wherein the data protection portion includes a file signature checking portion for checking whether the file signature is as expected for media that has not been modified.

14. The apparatus of claim 1, wherein the data protection portion includes a file signature checking portion for checking whether the file signature is as expected for media that has not been modified, and wherein a signature check is performed on files as they are installed, to determine whether any of the files have been altered.

15. The apparatus of claim 1, wherein the data protection portion checks the contents of a file as it is opened.

16. The apparatus of claim 1, wherein the file alteration checking portion allows sector level validation rather than file level validation.

17. The apparatus of claim 1, wherein the game content is stored in a game console specific format.

18. The apparatus of claim 1, wherein the media content includes non-game content.

19. The apparatus of claim 1, wherein the media content includes non-game content, and wherein the non-game content is stored in a non-game console specific format.

20. A method comprising:
checking whether a type of media containing a file is as expected for media that has not been copied by reading a media type used flag from an executable located on the media, wherein the media type used flag indicates a type of media that the executable should be contained within if the media is original, and if the type of media of the executable is not as expected, then installation of the file fails, and if the media type of the executable is as expected, then:
comparing an actual signature of a table of contents from a media with an expected signature of the table of contents to determine whether contents of the file have been altered;
calculating an actual signature based on reading clusters of data from the media, and comparing the actual signature with an expected signature found in the table of contents for every cluster of data read to determine whether contents of the file have been altered; and
installing the file when both the actual signature of the table of contents from the media matches the expected signature of the table of contents, and the actual signature which was calculated matches the expected signature found in the table of contents for every cluster of data read.

21. The method of claim 20, wherein the file exists on removable media.

22. The method of game 20, wherein the method is run on a game console.

23. The method of claim 20, wherein the data is stored in a non-game console specific format.

24. The method of claim 20, wherein method is a file alteration check.

25. The method of claim 20, that interfaces with a media containing game content.

26. The method of claim 20, that interfaces with a media containing non-game content.

27. The method of claim 20, wherein the data is stored in a game console specific format.

28. A method comprising:
obtaining game content from a media;
protecting the game content from modification, using a file alteration checking portion that determines whether the game content has been modified, and if the game content has been modified, then failing to allow installation of the game content; and
protecting the game content from modification, using a media type checking portion that determines whether the media is as expected for an original media that has not been copied by reading a media type used flag from an executable located on the media, wherein the media type used flag indicates a type of media that the executable should be contained within, and if the type of media of the executable is not as expected, then failing to allow installation of the game content.

29. A computer readable storage media having computer readable instructions that when executed by a processor causes the processor to:
check whether a type of media containing a file is as expected for an original media that has not been copied by reading a media type used flag from an executable located on a media, wherein the media type used flag indicates a type of media that the executable should be contained within, and when the type of media of the executable is as expected, then:
compare an actual signature of a table of contents from a media with an expected signature of the table of contents;
calculate an actual signature based on reading clusters of data from the media, and compare the actual signature with an expected signature found in the table of contents for every cluster of data read; and
install the file when both the actual signature of the table of contents from the media matches the expected signature of the table of contents, and the actual signature which was calculated matches the expected signature found in the table of contents for every cluster of data read.

30. A method comprising:
locating a standard executable on a media, wherein the standard executable includes a media type used flag which indicates a type of media that the executable should be contained within;
determining whether the media type indicated in the executable match that of the media;
locating an expected control data signature from a standard executable;
locating control data from a standard executable and computing a computed control data signature in response to the control data;

determining whether the computed control data signature matches the expected control data signature;

reading expected file data block signatures from the control data;

loading a file data block, and computing a computed file data block signature in response to the file data block; and determining whether the computed file data block signature matches the expected file data block signature.

31. The method of claim 30, further comprising failing to install game content in a game console if the computed control data signature does not match the expected control data signature.

32. The method of claim 30, further comprising failing to install game content in a game console if the computed file data block signature does not match the expected file data block signature.

33. The method of claim 30, further comprising launching the game content in a game console if the computed control data signature matches the expected control data signature.

34. The method of claim 30, further comprising launching the game content in a game console if the computed file data block signature matches the expected file data block signature.

* * * * *